(No Model.) 5 Sheets—Sheet 1.

J. KIRKALDY.
FEED WATER HEATER.

No. 351,182. Patented Oct. 19, 1886.

WITNESSES
E. A. Newman.
C. M. Newman.

INVENTOR
J. Kirkaldy
By his Attorneys (No Model.) 5 Sheets—Sheet 3.
J. KIRKALDY.
FEED WATER HEATER.

No. 351,182. Patented Oct. 19, 1886.

(No Model.)  5 Sheets—Sheet 4.
J. KIRKALDY.
FEED WATER HEATER.

No. 351,182.  Patented Oct. 19, 1886.

WITNESSES  INVENTOR (No Model.) 5 Sheets—Sheet 5.

J. KIRKALDY.
FEED WATER HEATER.

No. 351,182. Patented Oct. 19, 1886.

WITNESSES  
E. A. Newman  
C. M. Newman

INVENTOR  
J. Kirkaldy  
By his Attorneys  
Baldwin, Hopkins & Peyton

UNITED STATES PATENT OFFICE.

JOHN KIRKALDY, OF 40 WEST INDIA DOCK ROAD, COUNTY OF MIDDLESEX, ENGLAND.

FEED-WATER HEATER.

SPECIFICATION forming part of Letters Patent No. 351,182, dated October 19, 1886.

Application filed December 15, 1885. Serial No. 185,736. (No model.)

*To all whom it may concern:*

Be it known that I, JOHN KIRKALDY, a subject of the Queen of Great Britain, residing at No. 40 West India Dock Road, in the county of Middlesex, England, engineer, have invented certain new and useful Improvements in Feed-Water Heaters for Locomotive and other Boilers, applicable also to condensers, coolers, and heaters used for other purposes, of which the following is a specification.

This invention has for its object improvements in feed-water heaters for locomotive and other boilers, applicable also to condensers, coolers, and heaters used for other purposes.

In a feed-water heater for a locomotive, I provide a series of helical tubes, which may be interlaced or arranged parallel (the one to the other) within a casing, which serves as the steam-outlet and communicates with the blast-pipe. The tubes, which may be corrugated to increase the surface, are fixed at their lower ends into the side of a horizontal pipe or trunk-tube passing across the casing, and to this pipe the feed-water is supplied by the injectors. The water, before entering the heater, passes through a connecting-piece in which check-valves are provided, and a perforated plate, which serves as a dirt-arrester. The upper ends of the helical tubes are in like manner connected to a second similar horizontal pipe or trunk-tube, and from this the heated feed-water is led away through another check-valve into the boiler. The exhaust-steam, passing through the casing on its way to the chimney, imparts heat to the helical pipes, and from these it is absorbed by the feed-water. Where the arrangement is such as to cause a partial condensation of the exhaust-steam, (such that water is deposited in the casing,) I provide a drain-pipe by which this water is led away to again serve for feeding the boiler. Condensers, coolers, and heaters used for other purposes may be constructed in the same manner.

Figure 1:
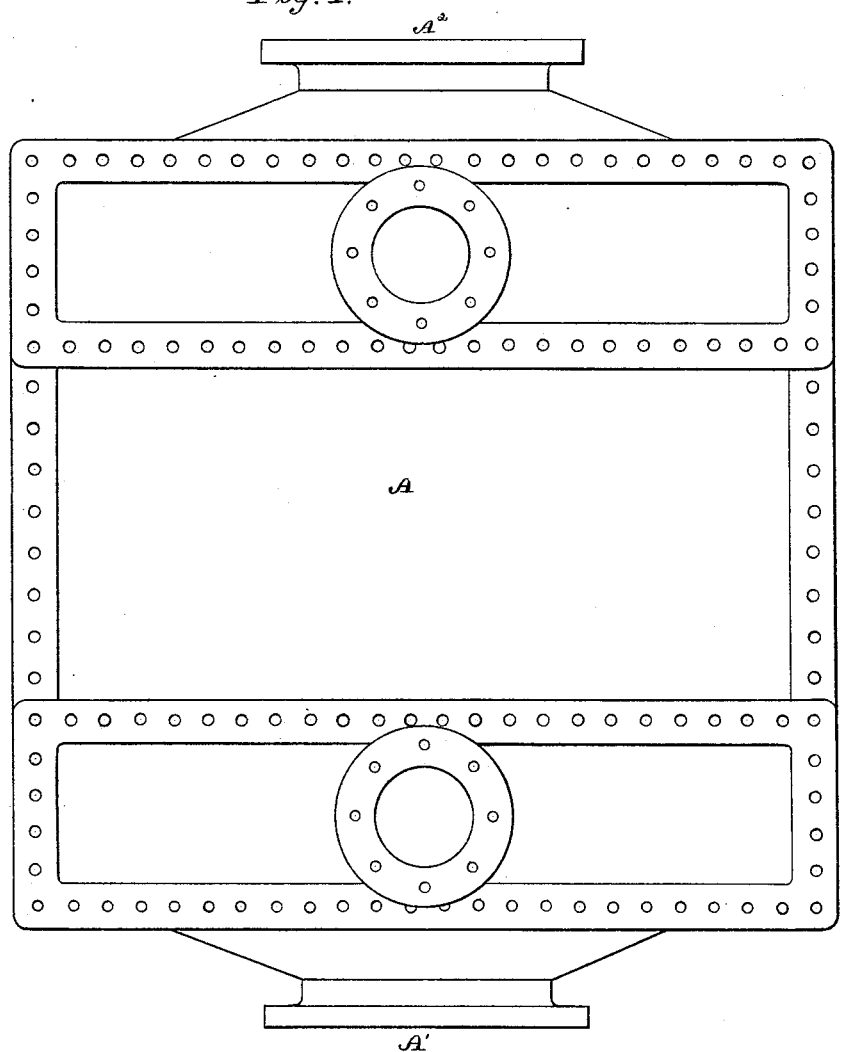
Figure 2:
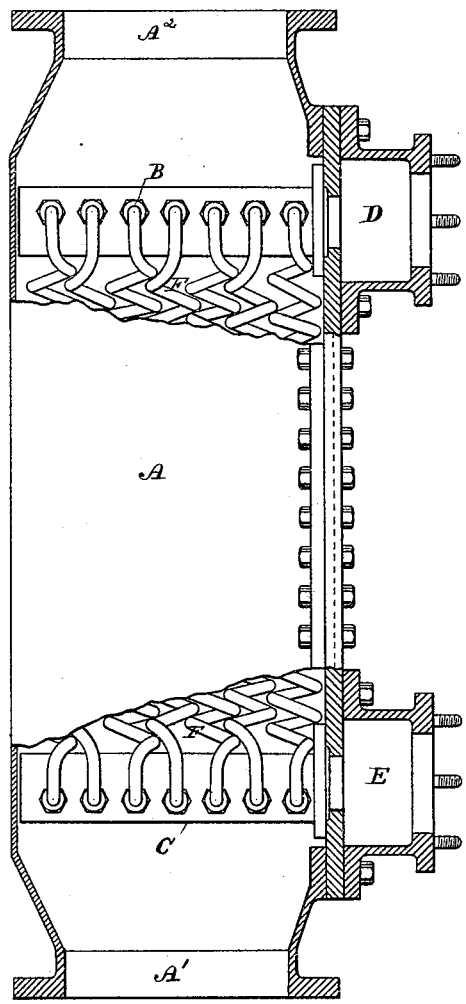
Figure 3:
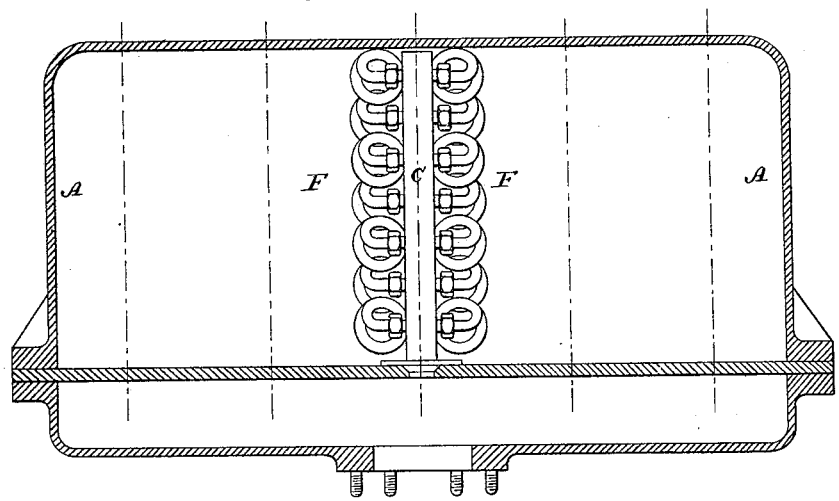
Figure 4:
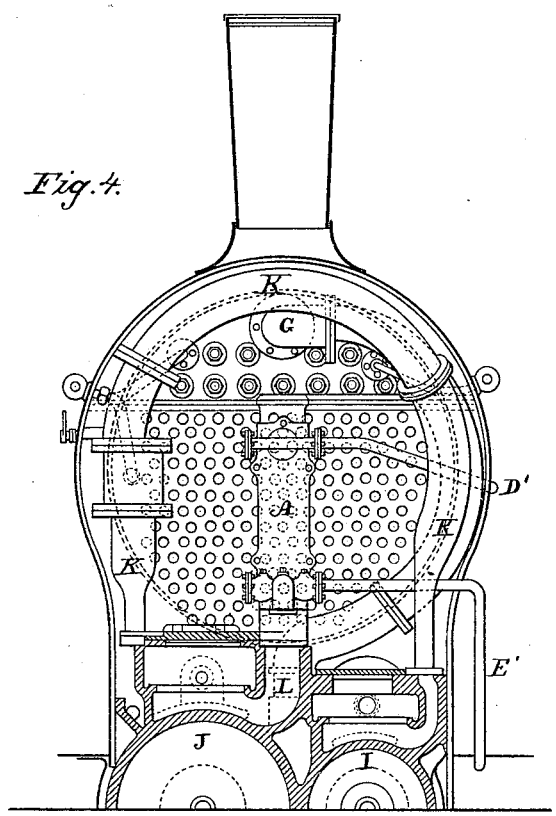
Figure 5:
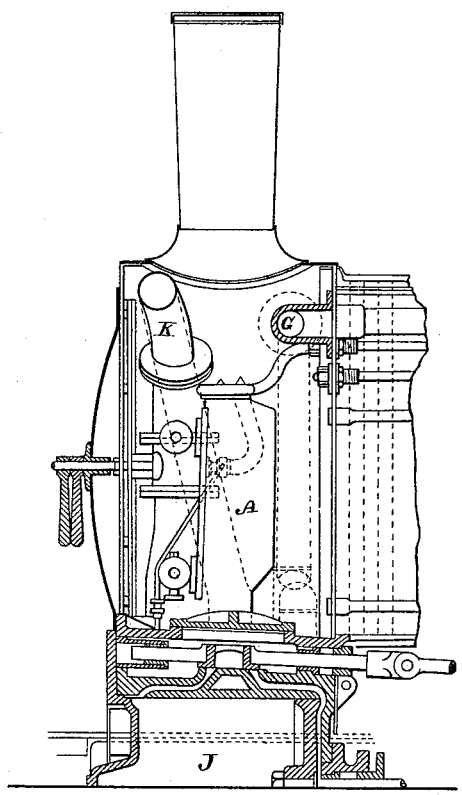

Figure 1 of the drawings, hereunto annexed, shows a front elevation, Fig. 2 an end elevation, partly in section, and Fig. 3 a horizontal section, of a feed-water heater formed as above described for a locomotive-boiler, with only the center set of tubes represented, the dotted parallel lines indicating the positions of the other sets. Fig. 4 is a front view on a smaller scale of the smoke-box of a locomotive, with one of the feed-heaters fitted within it. Fig. 5 is a longitudinal section of the same.

A is a casing, through which steam passing from the cylinders of the engine is exhausted.

B and C are horizontal pipes or trunk-tubes passing across the casing at top and bottom. The pipes B, at their front end, open into a casing-passage, D, and the pipes C into a casing-passage, E.

F are helical coils of tube passing from both sides of the pipes B to both sides of the pipe C. In the drawings each set of helical coils is shown to be composed of alternately right and left handed coils interlaced; but, if desired, the coils might simply be placed side by side without interlacing.

The drawings show only one group or set of trunk-tubes and helical tubes; but these parts may be duplicated, as required. The dotted lines in Fig. 3 indicate the positions of additional groups of tubes.

The exhaust-steam enters the casing A by the inlet A' at the bottom, and passes off by the outlet A² at the top to the ordinary injection-blast nozzle in the chimney.

In Figs. 4 and 5 the heater is shown placed within the smoke-box of a locomotive having a high-pressure and low-pressure cylinder; but it might be similarly applied within the smoke-box of other form of locomotive. In these figures G is a pipe for conveying steam from the steam-boiler to the valve-box of the high-pressure cylinder. I is the high-pressure cylinder; J, the low-pressure cylinder; K, a pipe for conveying steam from one to the other; L, the passage by which steam passing from the low-pressure cylinder is led to the bottom of the heater.

The feed-water is supplied to the casing-passage E by the pipe E', and passes off from the casing-passage D to the boiler by the pipe D'.

Surface condensers and coolers or heaters to be used for other purposes may similarly be formed of rows of helically-coiled tubes branching out from the sides of main or trunk tubes B, and passing to the sides of other main or trunk tubes C, all inclosed within a casing provided with an inlet and outlet, and through which the one fluid which is to be heated or cooled is passed, while the other fluid to be cooled or heated is passed through the helical coils.

The trunk-tubes B C may be disposed horizontally, vertically, or in other position.

Having now particularly described and ascertained the nature of my said invention and in what manner the same is to be performed, I declare that what I claim is—

The combination of the casing provided with the inlet and the outlet, the trunk-tubes passing across the casing at opposite ends or sides thereof, the trunk tube or tubes at one side or end serving as the inlet, and the other tube or tubes as the outlet for the fluid to be cooled or heated, and the series of coiled tubes passing from both sides of the trunk tube or tubes at one side or end of the casing to both sides of the trunk tube or tubes at the other side or end of the casing, substantially as and for the purpose set forth.

JOHN KIRKALDY.

Witnesses:
GEO. J. B. FRANKLIN,
T. J. OSMANS,
Both of 17 Gracechurch Street, London, E. C.